United States Patent
Yeh et al.

(10) Patent No.: US 6,553,399 B1
(45) Date of Patent: Apr. 22, 2003

(54) METHOD AND CIRCUIT FOR ENVELOPE DETECTION USING A PEEL CONE APPROXIMATION

(75) Inventors: Yuh-miin Yeh, Taoyuan (TW); Chin-Hung Chiou, Hsinchu (TW)

(73) Assignee: Chung-Shan Institute of Science, Taoyuan (TW)

(*) Notice: Subject to any disclaimer, the term of this patent is extended or adjusted under 35 U.S.C. 154(b) by 0 days.

(21) Appl. No.: 09/481,141

(22) Filed: Jan. 12, 2000

Related U.S. Application Data

(63) Continuation-in-part of application No. 09/049,605, filed on Mar. 27, 1998, now Pat. No. 6,070,181.

(51) Int. Cl.⁷ .............................................. G06F 7/552
(52) U.S. Cl. ...................................... 708/605; 708/204
(58) Field of Search ................................. 708/605, 204

(56) References Cited

U.S. PATENT DOCUMENTS

| | | | | |
|---|---|---|---|---|
| 3,829,671 A | * | 8/1974 | Gathright et al. .......... | 708/603 |
| 4,553,260 A | * | 11/1985 | Belt et al. .................. | 382/199 |
| 4,599,701 A | * | 7/1986 | Vojir et al. ................. | 708/605 |
| 4,694,417 A | * | 9/1987 | Cantwell .................... | 708/441 |
| 4,736,334 A | * | 4/1988 | Mehrgardt .................. | 708/605 |
| 4,747,067 A | * | 5/1988 | Jagodnik et al. ........... | 708/517 |
| 5,459,683 A | * | 10/1995 | Uesugi et al. .............. | 708/605 |
| 5,862,068 A | * | 1/1999 | Onodera ..................... | 708/605 |
| 6,070,181 A | * | 5/2000 | Yeh ............................ | 708/605 |

\* cited by examiner

*Primary Examiner*—David H. Malzahn
(74) *Attorney, Agent, or Firm*—William E. Pelton, Esq.

(57) ABSTRACT

The present invention discloses an envelope detection circuit by using a peel cone approximation concept. The envelope detection circuit comprises an absolute value comparision mechanism, a read only memory and a multiplier/adder mechanism. Particularly, the present invention uses a divider to generate an address of the read only memory to obtain less error and less hardware cost.

4 Claims, 4 Drawing Sheets

METHOD AND CIRCUIT FOR ENVELOPE DETECTION USING A PEEL CONE APPROXIMATION

CROSS REFERENCE RELATED TO APPLICATION

This is a continuation-in-part of application Ser. No. 09/049,605, filed Mar. 27, 1998, now U.S. Pat. No. 6,070, 181, the disclosure of which is incorporated herein by reference.

BACKGROUND OF THE INVENTION

1. Field of the Invention

The present invention relates to a method and a circuit for an envelope detection by using a peel cone approximation.

2. Description of the Related Art

An envelope detection circuit is a converting circuit applied to applications such as a spread spectrum communication, an amplitude detection for radar systems, and a receiver demodulation and waveform generation, etc., for finding a square root of the sum of two squares. Primarily, a concept which is different from conventional envelope detection concepts is used in the envelope detection method to achieve effects of both simplifying a circuit configuration and obtaining a low approximation error, which makes approximation to a physical calculated value through a peel cone approximation method.

As shown in FIG. 1, the detection circuit disclosed in U.S. Ser. No. 09/049,605, which was filed by the applicant, comprises: an absolute value determining circuit 30' for generating absolute values of two inputs X and Y; a maximum/minimum value determining circuit 31' for generating a bigger one and a smaller one of absolute values of the inputs X and Y; a delaying circuit 32' delaying the output of the maximum/minimum value determining circuit 31'; a plurality of comparison circuits 41'~45' and an address decoder 50' for generating an address signal of a read only memory 35' in which a coefficient table is stored; and a multiplier/adder 34', connected to the delaying circuit 32' and the read only memory 35' to generate a square root of the sum of two squares of inputs X and Y. Because above circuit uses a plurality of comparison circuits 41'~45' and an address encoder 50' to generate an address of the read only memory 35', it needs more gate counts and more area; and above circuit has more errors and slower operating speed.

SUMMARY OF THIS INVENTION

The object of the present invention is to eliminate the drawbacks of excessive error and more hardware cost in original application patent. To this end, the present invention provides a method and a circuit to transform two input Rectangular coordination points X and Y to r̂ which is an approximate value of radius r in polar coordinate.

The present invention mainly comprises: an absolute value determining circuit for determining positive values for incoming values of x and y with a 16-bit notation; a maximum/minimum value determining circuit for determining a maximum value and a minimum value for the incoming values of x and y after their positive values are determined; a read only memory for selecting corresponding constant values of a and b stored inside the read only memory in advance based on the address signal; and a multiplier/adder for performing multiplication and addition operations on the constant values of a and b from the read only memory together with the value of x and y from the maximum/minimum value determining circuit and outputting a square root of the sum of two squares of the values of x and y; wherein the characteristic is that there is a divider between the maximum/minimum value determining circuit and the read only memory, used to generate the value of k for the address of the read only memory.

The present structure can also be implemented by software, because of simplicity and less operations of the structure, the implementation by software also has the advantage as above-mentioned.

BRIEF DESCRIPTION OF THE DRAWINGS

This invention will be described according to the accompanying drawings in which.

PREFERRED EMBODIMENT OF THIS INVENTION

The relationship of a point (x, y) in rectangular coordinate and its radius r in polar coordinate has the following well-known transformation equation:

$$r=\sqrt{x^2+y^2} \qquad (1)$$

Figure 2:
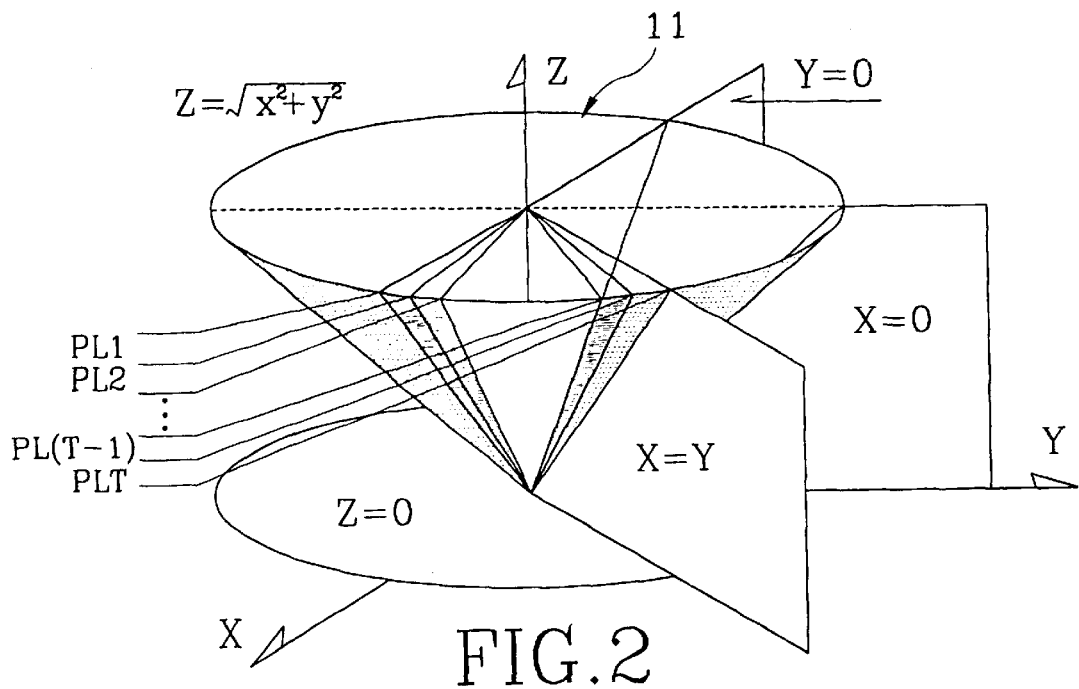
FIG. 2 shows a perspective view of a peel cone surface which is cut into L different planes according to the present invention.
Figure 3:
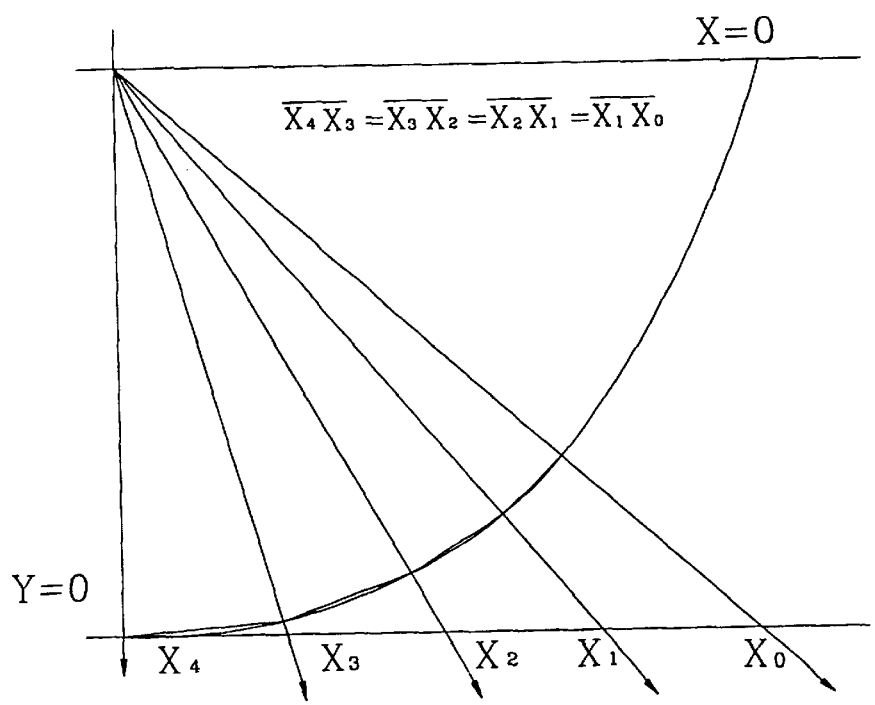
FIG. 3 is a top view of a peel cone between 0 degree to 45 degree which is approximated by using 4 cutting planes (T=4) according to the present invention.

The present invention uses the theorem of piece-wise linear approximation to replace above equation. FIG. 2 shows a perspective view of a peel cone surface which is cut into L different planes according to the present invention. The peel cone surface 11 represents a function $r=\sqrt{x^2+y^2}$, which passes through the original point of the rectangular coordinate and has a 45-degree contained angle with z axis. The surface 11 can be divided into eight parts. S=0 represents a range between 0 degree to 45 degree, s=1 represents a range between 45 degree to 90 degree, and in the same manner s=7 represents a range between 315 degree to 360 degree. Due to symmetric relationship, the range between s=1 to s=7 would be mapped into the range of s=0. Because the surface is not a linear function, it must be approximated by linear combination after the cut planes are formed. For example, the peel cone surface between 0 degree to 45 degree is cut into T planes which pass through the original point, and these planes are named PL1, PL2, . . . PL(T−1), and PLT. The principle of cutting a plane is to divide a line equally, and the above T cutting planes are used to approximate a peel cone surface between 0 degree to 45 degree. FIG. 3 is a top view of a peel cone between 0 degree to 45 degree which is approximated by using 4 cutting planes (T=4) according to the present invention. The approximate value r̂ of the radius r can be represented by equation (2).

$$\hat{r}=a(k)x_m+b(k)y_m \qquad (2)$$

Equation (2) can be implemented by a multiplier and two adders or two substracters, wherein $x_m=\text{MAX}(|x|,|y|)$, $y_m=\text{MIN}(|x|,|y|)$, k represents the serial number of cutting planes at which the rectangular coordinate point (x, y) is located, and T ($T=2^{sb}$, sb is sec-bit, and its value is equal or greater than 1) is the quantity of the cutting planes. Because $0 \leq y_m \leq x_m$, it can be inferred that $k \in \{0,1, \ldots 2^{sb}-1\}$, and k will be obtained by equation (3).

$$k = \left\lfloor 2^{sb} \cdot \frac{y_m}{x_m} \right\rfloor \quad (3)$$

a(k) and b(k) are coefficients of the cutting planes, which can be obtained by any three points on any cutting plane, and shown by equation (4) equation (5).

$$a(k) = \frac{k+1}{T}\sqrt{T^2+k^2} - \frac{k}{T}\sqrt{T^2+(k+1)^2} \quad (4)$$

$$b(k) = \sqrt{T^2+(k+1)^2} - \sqrt{T^2+k^2} \quad (5)$$

Table 1 is an example of using k as an index for showing corresponding a(k) and b(k) parameters, wherein a(k) and b(k) are expressed by 16 bits ($b_{15}$~$b_0$).

TABLE 1

| k | a (k) | $b_{15} \sim b_0$ | b (k) | $b_{15} \sim b_0$ |
|---|---|---|---|---|
| 0 | 1.0000 | 1111111111111111 | 0.0312 | 0000011111111110 |
| 1 | 0.9961 | 1111111100000001 | 0.0933 | 0001011111100010 |
| 2 | 0.9885 | 1111110100001101 | 0.1543 | 0010011110000000 |
| 3 | 0.9774 | 1111101000110101 | 0.2136 | 0011011010101110 |
| 4 | 0.9631 | 1111011010001110 | 0.2706 | 0100010101001000 |
| 5 | 0.9461 | 1111001000110110 | 0.3250 | 0101001100110100 |
| 6 | 0.9269 | 1110110101001001 | 0.3762 | 0110000001010001 |
| 7 | 0.9059 | 1110011111101000 | 0.4243 | 0110110010011110 |
| 8 | 0.8835 | 1100001000101110 | 0.4690 | 0111100000010001 |
| 9 | 0.8602 | 1101110000111001 | 0.5104 | 1000001010101001 |
| 10 | 0.8364 | 1101011000011111 | 0.5485 | 1000110001101100 |
| 11 | 0.8124 | 1100111111110111 | 0.5835 | 1001010101100001 |
| 12 | 0.7884 | 1100100111010001 | 0.6155 | 1001110110010011 |
| 13 | 0.7646 | 1100001110111100 | 0.6448 | 1010010100001111 |
| 14 | 0.7413 | 1011110111000100 | 0.6714 | 1010101111100010 |
| 15 | 0.7185 | 1011011111110000 | 0.6957 | 1011001000011001 |

Figure 4:
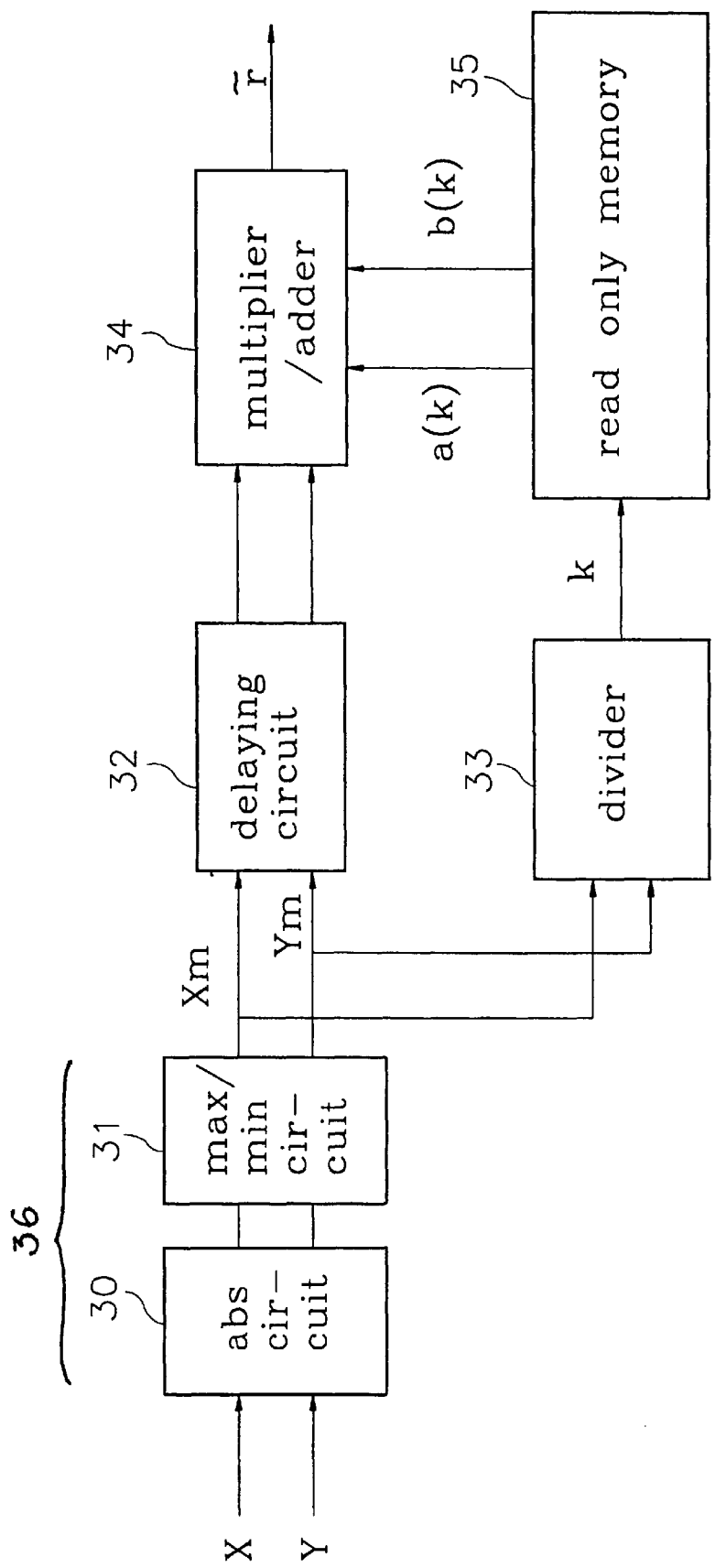
FIG. 4 shows a circuit according to an embodiment of the present invention.

FIG. 4 shows a circuit according to an embodiment of the present invention. The circuit comprises: a read only memory 35, an absolute value comparision mechanism 36, a delaying circuit 32, a divider 33 and a multiplier/adder mechanism 34. The read only memory 35 is used to store the parameters a(k) and b(k) based on the index k, and a method for storing the parameters is illustrated in Table 1. The absolute value comparision mechanism 36 includes an absolute value determining circuit 30 and a maximum/minimum value determining circuit 31. The absolute value comparision mechanism 36 is used to generate the bigger one $x_m$ and the smaller one $y_m$ of the absolute values of the input x and y. $x_m$ as a divisor and $y_m$ as a dividend are sent to the divider 33 to generate value k as a quotient, which are sb bits and used as address of the read only memory 35. The multiplier/adder mechanism 34 is connected to the divider 33 and the read only memory 35 for generating the result of equation (2). According to the consideration of timing issue and data synchronization, a delaying circuit 32 can be optionally connected between the absolute value comparision mechanism 36 and the multiplier/adder mechanism 34. $x_m$ and $y_m$ go through the delaying circuit 32 firstly, and then enter the multiplier/adder mechanism 34.

Figure 5:
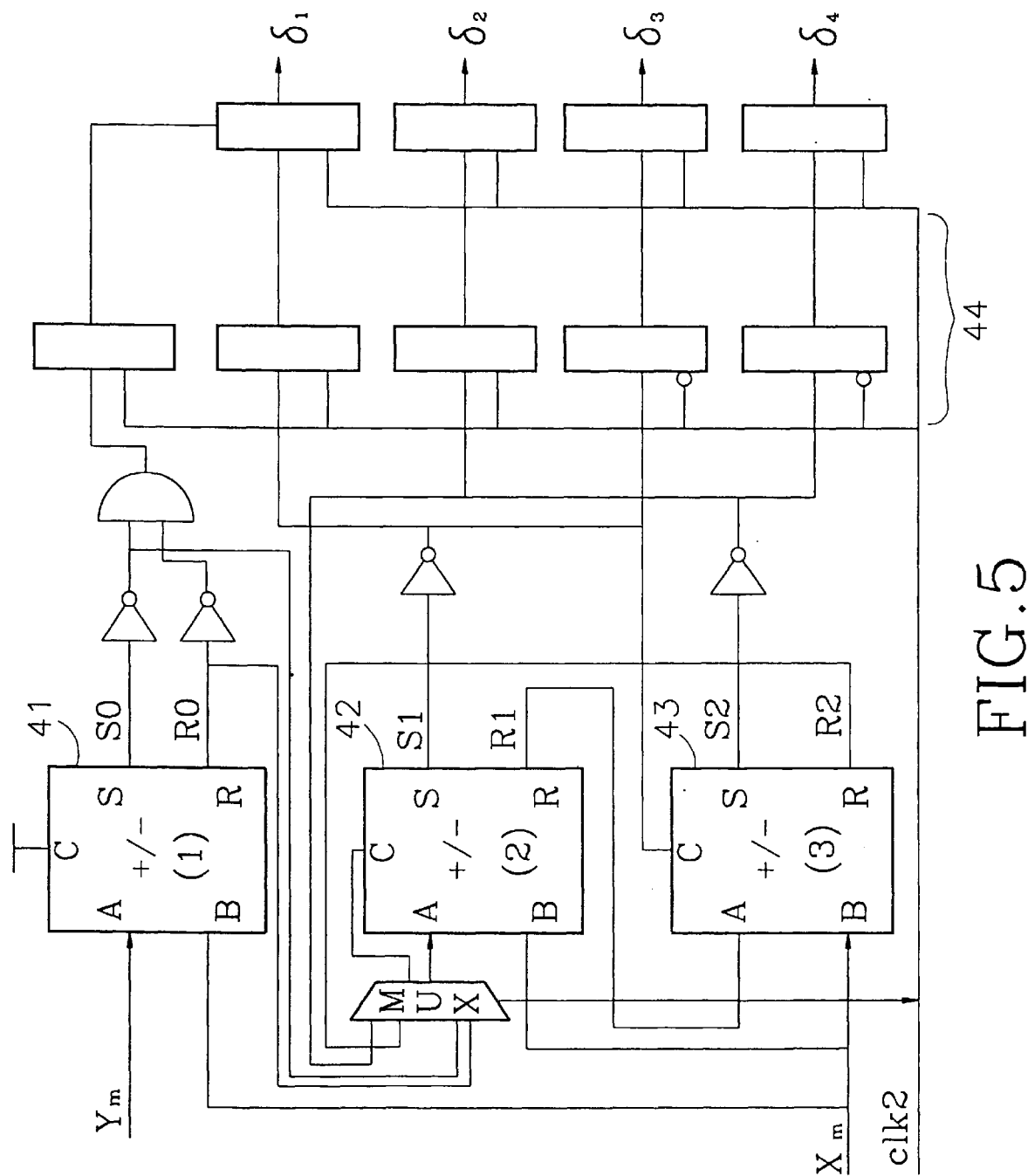
FIG. 5 shows a divider according to an embodiment of the present invention.

FIG. 5 shows a divider according to an embodiment of the present invention. The divider 33 comprises several adders/subtractors 41~43 and a group of registers 44. Because the inputs $x_m$ and $y_m$ of the divider 33 are between a specific range, as $0 \leq y_m \leq x_m$, the structure of the divider 33 is not as complex as a general purpose divider. The divider is implemented by the following steps:

(a) if $x_m$ is equal to $y_m$, the quotient k is "1111"

(b) if $x_m$ is not equal to $y_m$, then repeats the following steps (b1) and, (b2) for four times, and at each time a relative quotient bit is obtained;

(b1) if 2 times the value $y_m$ is bigger than the value $x_m$, then the relative quotient bit is 1 and the value $y_m$ is obtained by subtracting the value $x_m$ from the product of 2 and the value $y_m$;

(b2) if 2 times the value $y_m$ is smaller than the value $x_m$, then the relative quotient bit is 0 and the value $y_m$ is obtained by adding the value $x_m$ to the product of 2 and the value $y_m$.

The following is the implementation algorithm of the divider, whose output k is constituted by $q_3q_2q_1q_0$.

```
if y_m-x_m =0 then q_3q_2q_1q_0 ="1111"     /* set the quotients */
else
    for (n=3 ; n ≥ 0 ; n=n-1)               /* repeat for four times */
    {
    if 2*y_m-x_m ≥ 0 then
        { q_n=1 ; y_m=2*y_m x_m }           /* set the relative
    quotient */
    else
        { q_n=0 ; y_m=2*y_m+x_m }           /* set the relative
                                              quotient */
    }
```

The divider 33 of the present invention uses less hardware cost than the above-identified patent application, and can still reach the higher resolution. For example, as k=16, the gate count needed by the divider of the present invention is about one fourth of that of the comparison circuits needed in the above-identified patent application. Besides, the operating speed of the divider is faster than the comparison circuits in the above-identified patent application.

Figure 1:
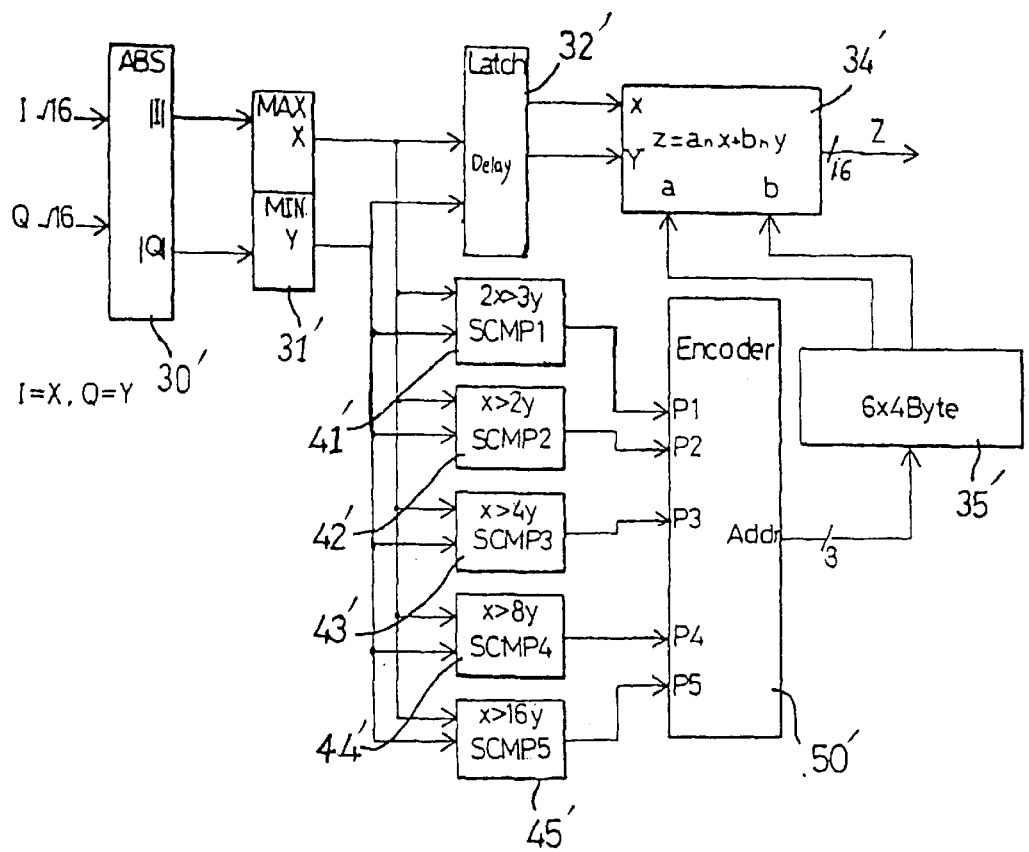
FIG. 1 shows a diagram of the structure of a prior art circuit.
Figure 6:
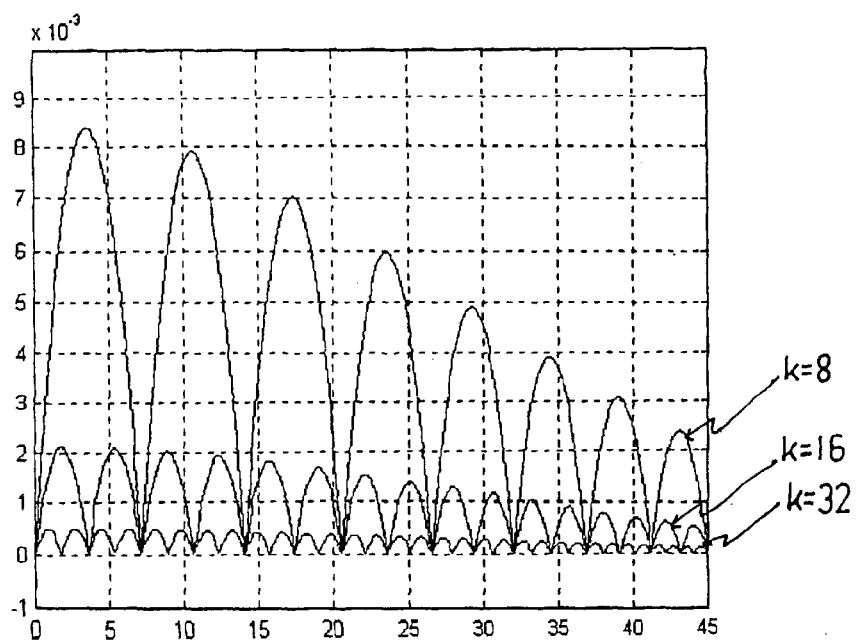
FIG. 6 shows a diagram of phase angles vs. errors according to the present invention.

FIG. 6 shows a diagram of phase angles vs. errors according to the present invention. When k=16, it means that 16 cutting planes or piece-wise lines are used in approximation, the maximum error is happened at 2 degree, and the corresponding error is about 0.002 dB.

The above-described embodiments of the present invention are intended to be illustrated only. Numerous alternative embodiments may be devised by those skilled in the art without departing from the scope of the following claims.

What is claimed is:

1. An improving envelope detection circuit using a peel cone approximation, comprising:
    an absolute value comparision mechanism including:
        an absolute value determining circuit for determining positive values for incoming values of x and y; and
        a maximum/minimum value determining circuit for determining a maximum value $x_m$ and a minimum value $y_m$ for the incoming values x and y after their positive values are determined;
    a read only memory for storing constant values a and b based on address signals; and
    a multiplier/adder mechanism for performing multiplication and addition operations on the constant values a and b from the read only memory together with values $x_m$ and $y_m$ outputted from the absolute value comparision mechanism and for outputting a square root of the sum of two squares of the values x and y;

wherein the improvement comprises:
a divider connected between said absolute value comparision mechanism and said read only memory to generate a quotient k with the dividend $y_m$ and the divisor $x_m$ for the address of said read only memory.

2. The circuit of claim 1, wherein said divider is implemented by the following steps:

(a) if $x_m$ is equal to $y_m$, the quotient k is "1111";

(b) if $x_m$ is not equal to $y_m$, then repeats the following steps (b1) and (b2) for four times, and at each time a relative quotient bit is obtained;

(b1) if 2 times the value $y_m$ is bigger than the value $x_m$, then the relative quotient bit is 1 and the value $y_m$ is obtained by subtracting the value $x_m$ from the product of 2 and the value $y_m$;

(b2) if 2 times the value $y_m$ is smaller than the value $x_m$, then the relative quotient bit is 0 and the value $y_m$ is obtained by adding the value $x_m$ to the product of 2 and the value $y_m$.

3. The circuit of claim 1, wherein said divider is implemented by the following algorithm:

```
if y_m-x_m =0 then q_3q_2q_1q_0 ="1111"
else
    for (n=3 ; n ≥ 0 ; n=n-1)
    {
        if 2*y_m-x_m ≥ 0 then
            { q_n=1 ; y_m=2*y_m x_m }
        else
            { q_n=0 ; y_m=2*y_m+x_m }
    }
``` wherein the binary representation of the quotient k is $q_3q_2q_1q_0$.

4. The circuit of claim 1, further comprising a delaying circuit connected between said absolute value comparision mechanism and said multiplier/adder mechanism.

* * * * *